United States Patent
Koreki et al.

(10) Patent No.: US 9,658,834 B2
(45) Date of Patent: May 23, 2017

(54) PROGRAM VISUALIZATION DEVICE, PROGRAM VISUALIZATION METHOD, AND PROGRAM VISUALIZATION PROGRAM

(71) Applicant: Hitachi, Ltd., Tokyo (JP)

(72) Inventors: Genta Koreki, Tokyo (JP); Daisuke Fukui, Tokyo (JP)

(73) Assignee: HITACHI, LTD. (JP)

( * ) Notice: Subject to any disclaimer, the term of this patent is extended or adjusted under 35 U.S.C. 154(b) by 50 days.

(21) Appl. No.: 14/727,929

(22) Filed: Jun. 2, 2015

(65) Prior Publication Data

US 2015/0355904 A1 Dec. 10, 2015

(30) Foreign Application Priority Data

Jun. 5, 2014 (JP) ................... 2014-116420

(51) Int. Cl.
*G06F 9/44* (2006.01)
(52) U.S. Cl.
CPC ..................... *G06F 8/33* (2013.01)
(58) Field of Classification Search
None
See application file for complete search history.

(56) References Cited

U.S. PATENT DOCUMENTS 8,307,326 B2 * 11/2012 Kobayashi ............... G06F 8/72
717/104

FOREIGN PATENT DOCUMENTS

WO 2009011056 A1 1/2009

* cited by examiner

*Primary Examiner* — Qamrun Nahar
(74) *Attorney, Agent, or Firm* — Volpe and Koenig, P.C.

(57) ABSTRACT

A data visualization device includes a module for a specific viewpoint which is selected and a diagram representing the program is generated for modules included in source code. For a module extracted using a module call relationship diagram creation unit, a data analysis unit calculates the relevance of a viewpoint, which is input by a user, by utilizing a module call relationship and a common data usage relationship. The relevance is calculated by multiplying the viewpoint relevance of a viewpoint dependent module serving as the base point and a viewpoint relevance weight in an action determination table and in inter-module path viewpoint relevance weight data. The calculated viewpoint relevance is corrected using a viewpoint relevance correction value in viewpoint relevance determination noise correction threshold data. Final viewpoint relevance is stored into per-module viewpoint relevance determination data and a program diagram in accordance with this viewpoint relevance is created.

10 Claims, 15 Drawing Sheets

VIEWPOINT TABLE 213

| VIEWPOINT | | VIEWPOINT RELEVANCE THRESHOLD |
|---|---|---|
| CATEGORY | KEYWORD | |
| MICROCOMPUTER | SH | 0.5 |
| | ARM | 0.6 |
| | ... | |
| BYTE ORDER | LITTLE_ENDIAN | 1 |
| | BIG_ENDIAN | 1 |
| ... | ... | |

VIEWPOINT RELEVANCE DETERMINATION NOISE CORRECTION THRESHOLD DATA

| VIEWPOINT RELEVANCE DETERMINATION NOISE CORRECTION ITEM | CONDITIONS | VIEWPOINT (CATEGORY/ KEYWORD) | THRESHOLD | VIEWPOINT RELEVANCE CORRECTION VALUE |
|---|---|---|---|---|
| NUMBER OF VIEWPOINT -UNRELATED PATHS ON CALLING SIDE | VIEWPOINT- RELATED MODULE CANNOT BE REACHED ON CALLED SIDE BUT CAN BE REACHED ON CALLING SIDE BY FOLLOWING PATHS BETWEEN MODULES WHOSE VIEWPOINT RELEVANCE IS GREATER THAN ZERO | SH | 1 | 0 |
| | | MICROCOMPUTER | 1 | 0 |
| | | LITTLE_ENDIAN | 2 | 0 |
| | | ... | ... | ... |
| RATIO OF VIEWPOINT -UNRELATED PATHS RELATIVE TO ALL PATHS ON CALLING SIDE (%) | | SH | 60 | 0 |
| | | MICROCOMPUTER | 50 | 0 |
| | | LITTLE_ENDIAN | 70 | 0 |
| | | ... | ... | ... |
| NUMBER OF CALL STAGES FROM VIEWPOINT DEPENDENT MODULE | — | SH | 2 | 0 |
| | | MICROCOMPUTER | 5 | 0 |
| | | LITTLE_ENDIAN | 6 | 0 |
| | | ... | ... | ... |
| | | ... | ... | ... |

| VIEWPOINT (CATEGORY/ KEYWORD) | MODULE | VIEWPOINT RELEVANCE |
|---|---|---|
| SH | MODULE A | 1 |
| | MODULE B | 0 |
| | MODULE C | 0.2 |
| | ... | |
| MICROCOMPUTER | MODULE A | 1 |
| | MODULE B | 0.7 |
| | ... | |
| | MODULE D | 0.3 |
| | ... | |
| ... | ... | |

PER-MODULE VIEWPOINT RELEVANCE DETERMINATION DATA

ACTION DETERMINATION TABLE

| SITUATION | ITEM | VIEWPOINT (CATEGORY/ KEYWORD) | VIEWPOINT RELEVANCE WEIGHT |
|---|---|---|---|
| NOT LIMITED TO CALL RELATIONSHIP | "WHETHER SUBSTITUTED INTO A GLOBAL VARIABLE BEING USED BY A VIEWPOINT-RELATED MODULE?" | SH | 0.8 |
| | | MICROCOMPUTER | 0.8 |
| | | LITTLE_ENDIAN | 0 |
| | | ... | ... |
| | "WHETHER WRITTEN INTO A FILE OR DB BEING USED BY A VIEWPOINT-RELATED MODULE?" | SH | 0.8 |
| | | MICROCOMPUTER | 0.8 |
| | | LITTLE_ENDIAN | 0 |
| | | ... | ... |
| LIMITED TO CALL RELATIONSHIP | "WHETHER A VARIABLE IS RECEIVED BY REFERENCE AND SUBSTITUTED INTO THE VARIABLE?" | SH | 0.8 |
| | | MICROCOMPUTER | 0.8 |
| | | LITTLE_ENDIAN | 0 |
| | | ... | ... |
| | "WHETHER A RETURN VALUE IS RECEIVED AS A VARIABLE AND USED?" | SH | 0.5 |
| | | MICROCOMPUTER | 0.5 |
| | | LITTLE_ENDIAN | 0 |
| | | ... | ... |
| | | ... | ... |

FIG. 6

INTER-MODULE PATH VIEWPOINT RELEVANCE WEIGHT DATA

| VIEWPOINT (CATEGORY/ KEYWORD) | PATH BETWEEN MODULES | | VIEWPOINT RELEVANCE WEIGHT |
|---|---|---|---|
| | CALL SOURCE MODULE | CALL DESTINATION MODULE | |
| SH | MODULE A | MODULE A1 | 0.8 |
| | | MODULE A2 | 0.5 |
| | MODULE B | MODULE B1 | 0.5 |
| | MODULE C | MODULE C1 | 0 |
| | ... | | |
| MICROCOMPUTER | MODULE A | MODULE A1 | 0.8 |
| | | MODULE A2 | 0.5 |
| | MODULE B | MODULE B1 | 0.5 |
| | ... | | |
| | MODULE D | MODULE D1 | 0.5 |
| | ... | | |
| ... | ... | | |

FIG. 7

PROGRAM VISUALIZATION DEVICE, PROGRAM VISUALIZATION METHOD, AND PROGRAM VISUALIZATION PROGRAM

CROSS-REFERENCE TO RELATED APPLICATION

The present application claims priority pursuant to 35 U.S.C. §119 from Japanese patent application no. 2014-116420, filed on Jun. 5, 2014, the entire disclosure of which is hereby incorporated herein by reference.

BACKGROUND OF THE INVENTION

1. Field of the Invention

The present invention relates to program visualization devices, program visualization methods, and program visualization programs.

2. Related Art

A program needs to be modified due to specification changes, fault recovery, or the like while being used over a long period of time. Such modification of a program is referred to as refactoring. In refactoring, for the purpose of reducing the load on a person in charge of modification and reducing work errors associated with modification, there is a need to automatically select and visualize a module included in a program and use the module. With regard to this need, for example, from the viewpoint of the refactoring, there is known a method for calculating a complexity for each module included in a target program and selecting a module having the high complexity. In International Publication No. WO2009/011056 (Patent Literature 1), in order to further improve the effect in refactoring, there is proposed a method for calculating the complexity for each module considering the whole program by using the damping coefficient of a module call hierarchical layer and the number of times of usage of the data or module for each call hierarchical layer to select a module having the high complexity.

SUMMARY OF THE INVENTION

However, with the conventional methods including the method of Patent Literature 1, although a module can be automatically selected from the viewpoint of refactoring, a module cannot be automatically selected from the other viewpoints. Therefore, when a program is visualized from a viewpoint other than the viewpoint of refactoring, a target module needs to be manually selected and thus a considerable man-hour is taken for this selection work.

The present invention aims to provide a program visualization device, a program visualization method, and a program visualization program capable of visualizing a program by automatically selecting, among modules included in the source code of the program, a module related to a specific viewpoint, and constructing and displaying a diagram representing the program.

In order to solve the above-described and other problems, according to an aspect of the present invention, there is provided a program visualization device for visualizing a program in units of modules included in a source code of the program, including: a source code acquisition unit for acquiring the source code to be visualized; a word data acquisition unit for acquiring word data described in the source code itself or in another source code or data related to the source code; a viewpoint information storage unit configured to associate and store viewpoint information that is to be noted in visualizing the modules and a viewpoint relevance threshold set for each piece of viewpoint information; a keyword storage unit configured to store, as a keyword, the word data that the word data acquisition unit has acquired from the source code based on the viewpoint information stored in the viewpoint information storage unit; a per-module viewpoint relevance determination data storage unit configured to store a viewpoint relevance set for each of the modules; an action determination table that associates and stores an item used for calculating the viewpoint relevance of each of the modules and viewpoint relevance weight data that is a weighting factor related to the viewpoint relevance; a viewpoint relevance weight data storage unit of an inter-module path configured to associate and store an inter-module call path used for calculating the viewpoint relevance of each of the modules and the viewpoint relevance weight data set for each inter-module call path; a module call relationship extraction unit for extracting a module call relationship indicative of a call relationship between modules included in the source code; a data analysis unit for calculating, for each of the extracted modules, a viewpoint relevance and storing the calculation result into the per-module viewpoint relevance determination data storage unit in consideration of a viewpoint relevance weight related to the call relationship between modules with a viewpoint dependent module as a base point, which is a module extracted using a keyword corresponding to the viewpoint information stored in the viewpoint information storage unit or a viewpoint relevance weight related to a common data usage relationship recorded in the action determination table; a module extraction unit for extracting a module from inside the source code; a visualization determination unit configured to determine whether or not to visualize the module extracted from the source code, by comparing the viewpoint relevance of each of the modules stored in the per-module viewpoint relevance determination data storage unit and a viewpoint relevance set in a corresponding keyword stored in the viewpoint information storage unit; and a display output unit configured to output the module, which the visualization determination unit has determined to visualize, in a predetermined format.

According to an aspect of the present invention, it is possible to visualize a program by automatically selecting, among the modules included in the source code of a program, a module related to a specific viewpoint, and constructing and displaying a diagram representing the program.

BRIEF DESCRIPTION OF THE DRAWINGS

FIG. 3 illustrates an example of a viewpoint table 213 in the embodiment.

FIG. 4 illustrates an example of a viewpoint relevance determination noise correction threshold data table 214 in the embodiment.

FIG. 5 illustrates an example of a per-module viewpoint relevance determination data table 215 in the embodiment.

FIG. 6 illustrates an example of an action determination table 216 in the embodiment.

FIG. 7 illustrates an example of an inter-module path viewpoint relevance weight data table 217 in the embodiment.

DETAILED DESCRIPTION OF THE INVENTION

Hereinafter, a program visualization device, program visualization method, and program visualization program according to an embodiment of the present invention will be described in detail using the accompanying drawings.

In the embodiment, described is an example of the method for visualizing a source code to be visualized, the source code including a plurality of modules, by creating a program diagram including only modules related to a specific viewpoint. As an example of the specific viewpoint, "microcomputer" is taken here, but the viewpoint is not limited thereto.

Figure 1:
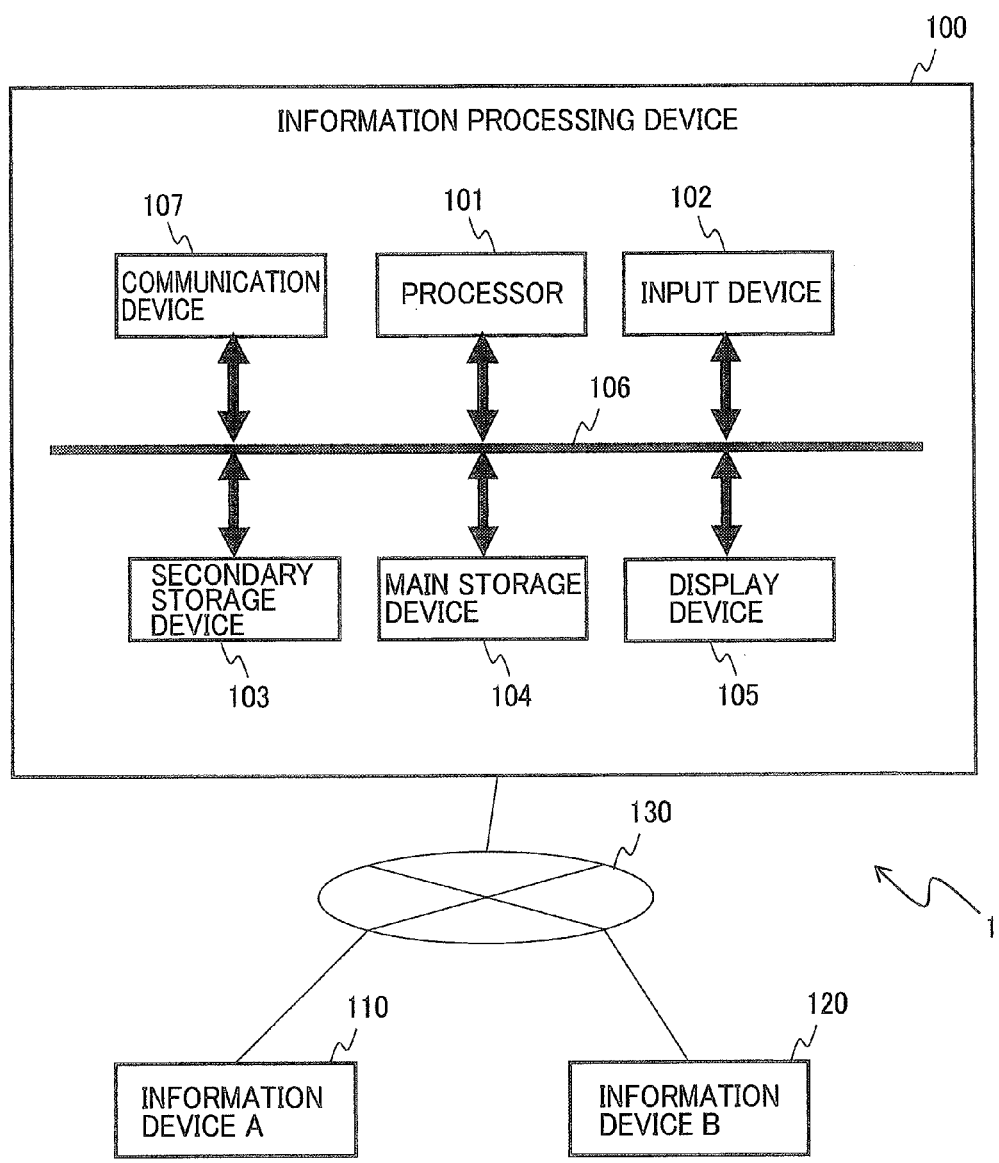
FIG. 1 illustrates an example of the hardware configuration of an information processing system 1 including a program visualization device 100 according to an embodiment of the present invention.

First, the information processing system 1 including an information processing device 100 according to the embodiment is described with reference to FIG. 1. FIG. 1 is a diagram illustrating an example of the hardware and system configuration of the information processing device 100 included in the information processing system 1 according to the embodiment. The information processing system 1 includes the information processing device 100 having the main functions in the embodiment implemented therein, and an information device A (110) and information device B (120) capable of storing data, such as other information processing devices and network storages. Here, these devices are connected to each other via a communication network 130, such as the Internet, for example. In the information processing system 1 of the embodiment, data processing for realizing the functions of the information processing system 1 is performed in the information device A and information device B, and visualization required during the modification or the like of the programs installed in the information devices A and B is performed by a program visualization function of the embodiment implemented in the information processing device 100.

The information processing device 100 includes: as the hardware, a processor 101, such as a CPU (Central Processing Unit) or a MPU (MicroProcessing Unit); an input device 102 including data input devices, such as a keyboard and a mouse; a secondary storage device 103 including storage devices, such as a hard disk drive (HDD) and a solid state drive (SSD); a main storage device 104 including storage devices, such as a ROM (Read Only Memory) and a RAM (Random Access Memory); a display device 105, such as a display; and a communication device 107, including a Network Interface Card (NIC) and the like, in which a function for the processor 101 to communicate with the communication network 130 is implemented. Note that the respective devices are connected to each other via a bus 106, to enable data transmission/reception between the respective devices.

Figure 2:
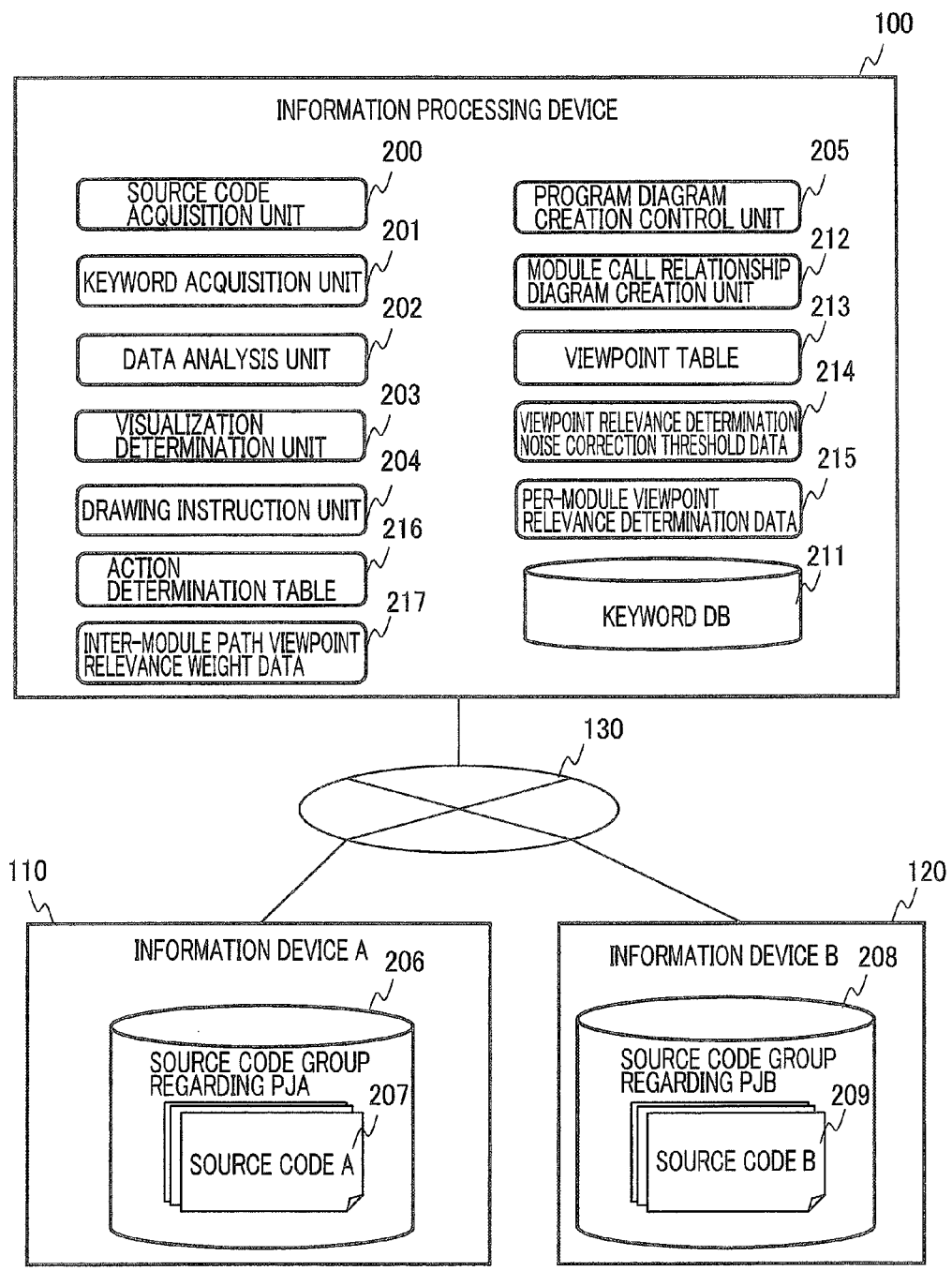
FIG. 2 illustrates an example of the software configuration of the program visualization device 100 of FIG. 1.

Next, the software configuration of each of the information processing device 100, information device A (110), and information device B (120) is described. FIG. 2 is a diagram illustrating an example of the functional block of each of the information processing device 100, information device A (110), and information device B (120) according to the embodiment. Note that, in the embodiment, description is given assuming that all the functional blocks of the information processing device 100 are the software programs or data executed or manipulated by the processor 101, but some or all of the functional blocks may be realized as hardware. Originally, in addition to the functional blocks illustrated in FIG. 2, there are an operating system (OS), a control program, and the like which perform the startup, management and the like of each functional block, but in the embodiment, the cooperative operations of these functional blocks will be described as needed. It is apparent that the OS and control program perform the startup and operation management of the functional blocks required for the cooperative operations that are described herein as needed, and thus the description of these OS and control program will be omitted.

As illustrated in FIG. 2, the information processing device 100 according to the embodiment includes, as the functional blocks: a source code acquisition unit 200 for acquiring a source code to be processed; a keyword acquisition unit 201 (word data storage unit) for acquiring a keyword for source code analysis: a data analysis unit 202 for analyzing the source code; a visualization determination unit 203 for determining whether or not to visualize a program for each module included in the source code; a drawing instruction unit 204 for drawing a program diagram; a program diagram creation control unit 205 for managing the whole procedure for creating the program diagram that is a result of visualization; a keyword database (DB) 211 storing a keyword for source code analysis; a module call relationship diagram creation unit 212 for creating a diagram illustrating a call relationship between all the modules included in the source code; a viewpoint table 213 (viewpoint information storage unit) including a module visualization viewpoint; a viewpoint relevance determination noise correction threshold data table 214 (viewpoint relevance determination correction information storage unit) including the data for determining a relevance with respect to the visualization viewpoint of each module; a per-module viewpoint relevance determination data table 215 (per-module viewpoint relevance determination data storage unit); an action determination table 216; and an inter-module path viewpoint relevance weight data table 217 (inter-module path viewpoint relevance weight data storage unit). Moreover, the information device A (110) includes a source code group 206 and source code A (207) related to a project A (in the view, abbreviated as "PJA") executed by the information processing system 1. The source code A (207) includes a partial program in units of modules. Moreover, the information device B (120) similarly includes a source code group 208 and source code B (209) related to a project B (in the view, abbreviated as "PJB") executed by the information processing system 1. The source code B (209) includes a partial program in units of modules as with the source code A (207). Note that, the source code group 206 and source code A (207) related to the project A and the source code group 208 and source code B (209) related to the project B do not necessarily need to be arranged in the above-described place, but may be stored in any one of the information processing device 100, information device A (110), and information device B (120). Note that the above-described each functional block and data group will be described one by one hereinafter in relation to the data processing content of the information processing device 100 and the like.

Here, the data and the like used for visualization in the information processing device 100 of the embodiment are described. First, the viewpoint table 213 is described. FIG. 3 illustrates an example of the configuration of the viewpoint table 213. A system administrator or the like sets and stores the viewpoint table 213 in an appropriate storage area in advance before starting the operation of the information processing device 100. Word data indicative of a viewpoint of a module to be visualized in a program to be processed and the threshold of a viewpoint relevance that is used in selecting a module related to the viewpoint are stored in the viewpoint table 213. In the example of FIG. 3, as the word indicative of a viewpoint, a category and a keyword related to the category are employed to arrange the data. For example, a category "microcomputer" includes subordinate keywords, such as SH (SuperH (registered trademark)) and ARM (registered trademark), belonging to the category "microcomputer". Moreover, a category "byte order" includes keywords, such as LITTLE_ENDIAN and BIG_ENDIAN, indicative of the type of arrangement order of byte data. These categories and keywords are used when the keyword acquisition unit 201 that is the functional block of the information processing device 100 acquires a source code, a macro that is set in the development and maintenance data or the like related to the source code, keyword information, or the like and stores the same into the keyword DB 211. The threshold of a viewpoint relevance is used in selecting a module related to a viewpoint of visualization. Although the calculation of the viewpoint relevance will be described later, the viewpoint relevance is calculated for each module. This relevance from the viewpoint of a module is compared with a threshold described in the viewpoint table 213 and used to determine whether or not to visualize the module. Note that, selection of a module related to this viewpoint is performed not only for determining whether or not to visualize the module, but also may be utilized for other control, such as for highlighting a specific module.

Next, the viewpoint relevance determination noise correction threshold data table 214 is described. FIG. 4 illustrates an example of the configuration of the viewpoint relevance determination noise correction threshold data table 214. A system administrator or the like sets and stores the viewpoint relevance determination noise correction threshold data table 214 in an appropriate storage area in advance before starting the operation of the information processing device 100. The viewpoint relevance determination noise correction threshold data table 214 is used for the purpose of determining a module as noise to correct its viewpoint relevance, the module having the viewpoint relevance calculated higher than an intended value, for example such as a module whose viewpoint relevance needs to be zero but is actually calculated as a value greater than zero. The respective items of the noise correction determination, conditions, viewpoint, threshold, and viewpoint relevance correction value are stored in the viewpoint relevance determination noise correction threshold data table 214. In the example of FIG. 4, as these determination items, there are set the items of "number of viewpoint-unrelated paths on the calling side", "ratio (%) of viewpoint-unrelated paths relative to all the paths on the calling side", and "number of call stages from a viewpoint dependent module". The conditions assumed by each item may be set to these determination items. In the example of FIG. 4, the items of "number of viewpoint-unrelated paths on the calling side" and "ratio (%) of viewpoint-unrelated paths relative to all the paths on the calling side" are conditioned such that these items are under the condition that "a viewpoint-related module cannot be reached on the called side but can be reached on the calling side by following the paths between the modules whose viewpoint relevance weight is greater than zero". These determination items and preconditions will be described in detail later. When the determination item does not satisfy this condition, the determination item is determined as "false", i.e., determined not as the noise correction target.

Moreover, in the example of FIG. 4, the category/keyword indicative of the viewpoint of a module designated by a user include SH, microcomputer, and LITTLE_ENDIAN, and the respective thresholds are set as illustrated in FIG. 4. Here, the viewpoint-related module is described. The viewpoint-related module refers to the following four types of modules (1) to (4).

(1) A module whose keyword related to the above-described viewpoint is described directly in the form of a comment, macro, or the like. This type of module is the viewpoint-related module, and may be referred to as a viewpoint dependent module.

(2) A module having a viewpoint dependent module on the called side in a direct or indirect form. This type of module may be referred to as a viewpoint-related module because it uses a viewpoint dependent module. However, this type of module might also include a module that does not need to use a viewpoint dependent module, and therefore such a module needs to be excluded from a module to be visualized.

(3) A module having a viewpoint dependent module on the calling side in a direct or indirect form. This type of module may be referred to as a viewpoint-related module because it is used by a viewpoint dependent module. However, this type of module might also include a generally used module, and such a module needs to be excluded.

(4) A module that substitutes a value into the data being used by a viewpoint-related module. This type of module may be referred to as a viewpoint-related module because the both modules interact with each other via the data. However, this type of module might also include a module in such a manner that the both modules just refer to common data, and in this case they need to be excluded as modules that do not interact with each other.

In the embodiment, for simplicity, a module whose viewpoint relevance is zero is determined as a viewpoint-unrelated module, while a module whose viewpoint relevance is greater than zero is determined as a viewpoint-related module. But not limited thereto, a module whose viewpoint relevance is less than a predetermined threshold may be referred to as a viewpoint-unrelated module, while a module whose viewpoint relevance is equal to or greater than a certain threshold may be referred to as a viewpoint-related module.

Moreover, in the example of FIG. 4, the viewpoint relevance determination noise correction items include three items of the "number of viewpoint-unrelated paths on the calling side", "ratio (%) of viewpoint-unrelated paths relative to all the paths on the calling side", and "number of call stages from a viewpoint dependent module". The number of viewpoint-unrelated paths on the calling side is the number of paths, wherein all the modules present on the paths in following from a module to be determined to the headmost module on the calling side are unrelated-modules. Usually, the more frequently used from a module unrelated to a viewpoint, the more likely a module to be determined is unrelated to the viewpoint. The ratio (%) of viewpoint-unrelated paths relative to all the paths on the calling side is the ratio of the number of viewpoint-unrelated paths on the calling side relative to all the paths present in following from a module to be determined to the headmost module on the calling side. Usually, the more frequently used from a module unrelated to a viewpoint, the higher the ratio of the viewpoint-unrelated paths becomes and the more likely a module to be determined is unrelated to the viewpoint. The number of call stages from a viewpoint dependent module is the number of call stages between a module to be determined and a viewpoint dependent module closest to the module to be determined. Usually, the viewpoint-related modules have a close call-relationship, and therefore the farther away from a viewpoint dependent module, the more likely the module to be determined is unrelated to the viewpoint. In the embodiment, zero is used as the viewpoint relevance correction value when the viewpoint relevance determination noise correction item is determined as "true", and the module to be determined is handled as a viewpoint-unrelated module.

Next, the per-module viewpoint relevance determination data table 215 is described. FIG. 5 illustrates an example of the configuration of the per-module viewpoint relevance determination data table 215. A system administrator or the like sets and stores the per-module viewpoint relevance determination data table 215 in an appropriate storage area in advance before starting the operation of the information processing device 100. The viewpoint relevance calculated for each module included in a program to be visualized is stored in the per-module viewpoint relevance determination data table 215. In the example of FIG. 5, for a keyword or category, such as SH and microcomputer, expressing the viewpoint about each module, the viewpoint relevance of a module A, a module B, a module C, or a module D that is the module inside a source code to be visualized is described. The value of a viewpoint relevance is a numerical value in a range from zero to one, and is zero when the module is unrelated to the viewpoint, and the stronger the relevance of a viewpoint, the larger the numerical value becomes.

Next, the action determination table 216 is described. FIG. 6 illustrates an example of the configuration of the action determination table 216. A system administrator or the like sets and stores the action determination table 216 into an appropriate storage area in advance before starting the operation of the information processing device 100. An item for determining, by investigating whether a module to be determined interacts with a viewpoint-related module through common use of data, whether or not there is any relevance between modules is stored in the action determination table 216. These determination items are selectively used according to a determination situation, and are classified according to whether or not the determination items are the items that are limited when there is a call relationship between modules. Examples of the items that are limited to a call relationship between modules include the items "whether a variable is received by reference and substituted into a corresponding variable?" and "whether a return value is received as a variable and used?". Examples of the items that are not limited to a call relationship between modules include the items "whether substituted into a global variable being used by a viewpoint-related module?" and "whether substituted into a file being used by a viewpoint-related module?". The item "whether a return value is received as a variable and used?" is limited to a case where this return value is received and used as a variable usable as a flag to be used, for example in interrupt processing, a case where this return value is used in checking an error value, or the like, so that an action relationship more meaningful to a person in charge of modifying a program or the like can be determined more accurately. In the action determination table 216, per-viewpoint viewpoint relevance weight data (hereinafter, simply referred to as "viewpoint relevance weight") is described for each determination item. The viewpoint relevance weight is a value that is used in calculating the viewpoint relevance of a module or in setting a viewpoint relevance weight of a call path between modules, and will be described later.

Next, the inter-module path viewpoint relevance weight data table 217 is described. FIG. 7 illustrates an example of the inter-module path viewpoint relevance weight data table 217. A system administrator or the like sets and stores the inter-module path viewpoint relevance weight data table 217 in an appropriate storage area in advance before starting the operation of the information processing device 100. In the inter-module path viewpoint relevance weight data table 217, a viewpoint relevance weight set to a call path between modules is recorded for each viewpoint in visualizing a program. The viewpoint relevance weight recorded in the inter-module path viewpoint relevance weight data table 217 is set using the viewpoint relevance weight described in the action determination table 216 of FIG. 6, and the processing contents will be described later.

Figure 8:
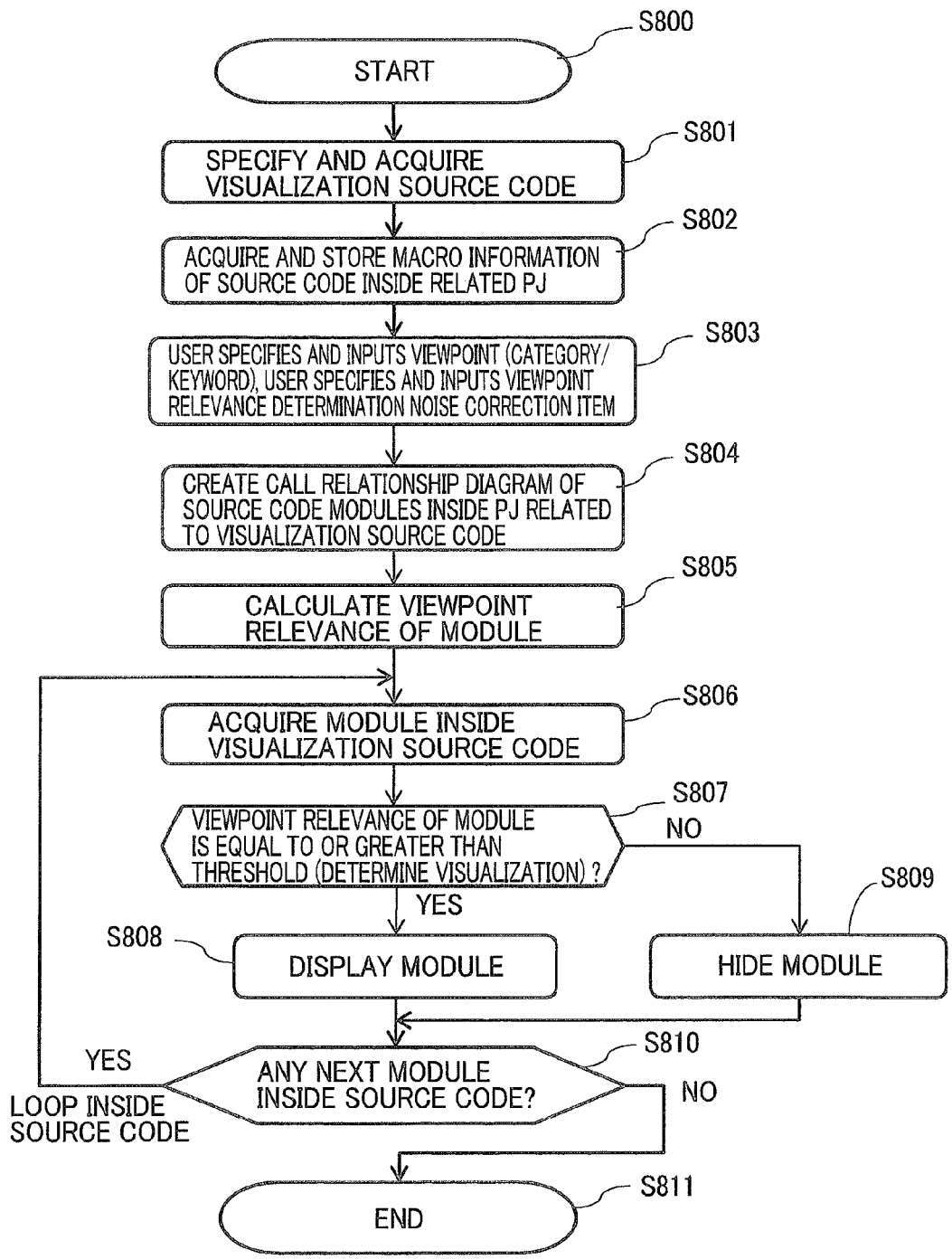
FIG. 8 illustrates an example of a program diagram creation flowchart in the embodiment.

Next, the procedure for visualizing a program by the information processing device 100 of the embodiment is described. FIG. 8 illustrates an example of the processing flow of the procedure for visualizing the source code A (207) installed in the information device A (110) of FIG. 2, by the information processing device 100.

Upon receipt of an instruction or the like from the input device 102 of the information processing device 100, the program diagram creation control unit 205 starts to create a program diagram (S800). In the embodiment, an example is illustrated for creating a program diagram including only the modules related to "microcomputer" instead of visualizing all the modules inside a program as the program diagram.

First, the program diagram creation control unit 205 accepts, through the input device 102 or the like, designation of a source code that is visualized from among the source code group 206. In this embodiment, assume that the source code A of the information device A has been designated as the source code to be visualized. Once the source code to be visualized is designated, the source code acquisition unit 200 acquires the source code A to be visualized from among the source code group 206 related to the project A (PJA) via the communications device 107 (S801). When the size of the source code group 206 is huge and it is predicted that it takes time to search the source code A, then by a user's instruction, a file predicted to be used can be moved or copied in advance to a storage area, for example such as the information processing device 100, allowing for high-speed search.

Next, the keyword acquisition unit 201 acquires macro and keyword information set in the source code group 206 related to the project A, which the source code A to be visualized acquired in S801 belongs to, and stores the same into the keyword DB 211 (S802). In this case, the macro and keyword information may be stored into the keyword DB 211 with reference to the classification of keywords according to the viewpoint table 213. Thus, a keyword including a broader concept, for example such as the keyword SH that is a keyword and a microcomputer that is the category including SH, may be arranged. Note that, in this example, as a keyword which the keyword acquisition unit 201 acquires, the macro and keyword described inside the source code are exemplified, but not limited thereto. Various kinds of descriptive contents, for example such as a variable name and a function name, may be used. Furthermore, an object, from which a keyword is acquired, is not limited to the source code group 206 related to the project A which the source code A to be visualized belongs to. Various source codes and the development/maintenance data related thereto, such as the source code group 208 related to the project B (PJB), which the source code B (209) nonrelated to a target to be visualized belongs to, may be used.

Next, the program diagram creation control unit 205 accepts designation of a viewpoint (the keyword/category) stored in the keyword DB 211, via the input device 102. In this case, using the concept of category, not only one keyword but also a plurality of related keywords can be utilized as a whole in selecting a module. In this example, assume that a user designates, as a viewpoint, microcomputer that is a category. Moreover, the program diagram creation control unit 205 accepts designation of a viewpoint relevance determination noise correction item from the input device 102. In this example, the "number of viewpoint-unrelated paths on the calling side", "ratio (%) of viewpoint-unrelated paths relative to all the paths on the calling side", and "number of call stages from a viewpoint dependent module" that are the items included in the viewpoint relevance determination noise correction threshold data table 214 are assumed as the viewpoint relevance determination noise correction items. Here, assume that a user specified the "number of viewpoint-unrelated paths on the calling side" as the viewpoint relevance determination noise correction item. Note that, the viewpoint relevance determination noise correction items are not limited to the above-described items, and moreover the number of noise removal items is not limited to one but a plurality of items may be used at the same time. Moreover, a user does not necessarily need to input the viewpoint relevance determination noise correction item, but various selection methods can be contemplated, for example an item having a higher usage rate is automatically selected by priority.

Next, the module call relationship diagram creation unit 212 creates a call relationship diagram related to a module defined inside the source code A to be visualized, the source code A being designated by a user in S801, or related to a module being called inside the source code A (S804). In this case, a call relationship diagram is created not only by considering a module directly called from a module related to the source code A and a module directly calling a module related to the source code A but also by considering a module being indirectly called from a module related to the source code A and a module that is indirectly calling a module related to the source code A. In this case, furthermore, the contents of a compiler option, such as #pragma, designated in compiling a source code may be contemplated.

Next, with regard to all the modules included in the module call relationship diagram created in S804, the data analysis unit 202 calculates the viewpoint relevance and stores the result into the per-module viewpoint relevance determination data table 215 (S805). Note that the processing contents will be described later.

Next, the program diagram creation control unit 205 acquires one module as a module that is to be determined to be visualized, among the modules not yet determined to be visualized that are included in the source code A acquired in S801 (S806). Next, the visualization determination unit 203 determines whether or not to visualize this module (S807). In this case, the viewpoint relevance for each module stored in the per-module viewpoint relevance determination data table 215 is compared with the threshold of a viewpoint, which is specified by a user in S803, stored in the viewpoint table 213, and if it is determined that the former value is larger than the latter value (S807, Yes), then the drawing instruction unit 204 displays this module (S808). If it is determined that the value of the viewpoint relevance is smaller than the threshold (S807, No), the drawing instruction unit 204 hides this module (S809).

Next, the program diagram creation control unit 205 determines whether or not there is any module not yet determined to be visualized in the source code A acquired in S801 (S810). If it is determined that there is a module not yet determined to be visualized (S810, Yes), the program diagram creation control unit 205 returns to S806. If it is determined that there is no module not yet determined to be visualized (S810, No), the program diagram creation control unit 205 completes the program diagram creation procedure (S811). With the above program diagram creation procedure, a program diagram including the module corresponding to the viewpoint relevance in a program to be visualized can be created.

Figure 9:
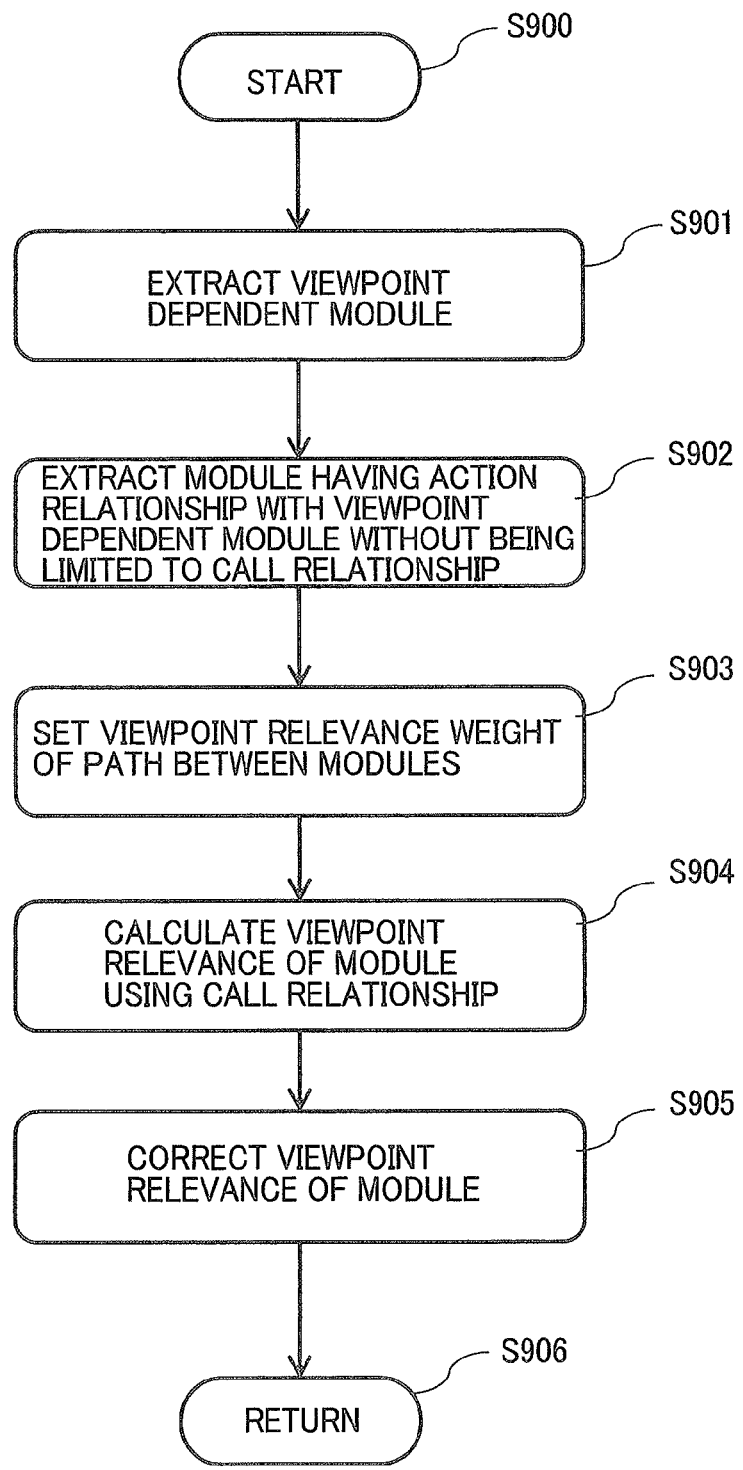
FIG. 9 illustrates an example of a module viewpoint relevance calculation flowchart in the embodiment.

Next, the procedure for calculating the viewpoint relevance of a module in the program diagram creation procedure illustrated in FIG. 8 is described. FIG. 9 illustrates an example of the processing flow of the procedure for calculating the viewpoint relevance of a module (S805 of FIG. 8). Once the procedure is started in S900, the data analysis unit 202 firstly records the names of all the modules related to the module call relationship diagram created in S804 into the per-module viewpoint relevance determination data table 215, and extracts a viewpoint dependent module from among all the modules related to the module call relationship diagram created in S804 (S901). In this case, in this example, all the source codes of the source code group 206 related to the project A, which the source code A belongs to, are assumed to be utilized, and when a keyword is designated as the viewpoint designated by a user in S803, a module including the description of this keyword is extracted as a viewpoint dependent module, while when a category is designated, a module with the keyword description of any one of the keywords in one or a plurality of categories described in the viewpoint table 213 is extracted as a viewpoint dependent module. In this example, assume a case where the category "microcomputer" is designated by a user. In the viewpoint table 213, two keywords, i.e., SH and ARM, are described in the category "microcomputer", and therefore a module with the description of either one of these keywords is extracted as a viewpoint dependent module. With regard to the viewpoint dependent module extracted in S901, "1" is recorded on the viewpoint relevance in the per-module viewpoint relevance determination data table 215. As the viewpoint relevance recorded here, any value other than "1" may be recorded. Moreover, the source code group utilized in the procedure for extracting the viewpoint dependent module is not limited to the source code group 206 related to the project A, which the source code A to be visualized belongs to, but the source code of another project, e.g., the source code group 208 related to the project B, if available, may be utilized as needed.

Next, with the viewpoint dependent modules (viewpoint-related modules whose viewpoint relevance recorded in the per-module viewpoint relevance determination data table 215 is one) extracted in S901 as a base point, regardless of whether or not these modules have a call relationship with each other, the analysis unit 202 extracts a module having an action relationship via common data with the viewpoint dependent modules as a viewpoint-related module (S902). The processing contents will be described later.

Next, the data analysis unit 202 sets the viewpoint relevance weights of the call paths present between all the modules related to the module call relationship diagram created in S804 (S903). The processing contents will be described later.

Next, the data analysis unit 202 calculates the viewpoint relevance of a module using the call relationship of the module (S904). The processing contents will be described later.

Next, the data analysis unit 202 corrects the module viewpoint relevance calculated in S904 (S905). The processing contents will be described later. The above procedure allows to calculate a viewpoint relevance serving as the determination index to determine whether or not to visualize viewpoint dependent modules and modules having a call relationship therewith.

Figure 10:
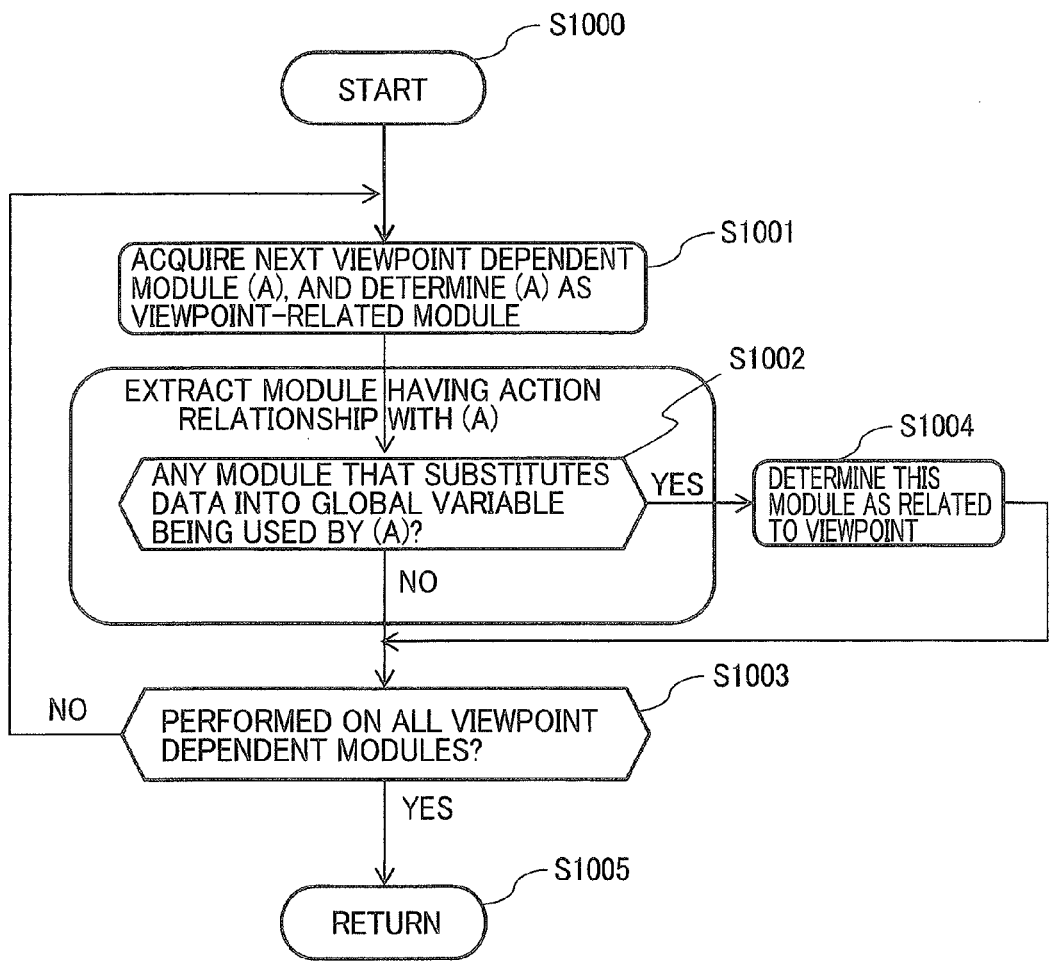
FIG. 10 illustrates an example of a flowchart of extracting a module that does not have a call relationship with but has an action relationship with a viewpoint dependent module in the embodiment.

FIG. 10 illustrates an example of the flowchart in extracting, as a viewpoint-related module, a module that does not have a call relationship with but has an action relationship via common data with a viewpoint dependent module. The flow details S902 in the procedure for calculating the viewpoint relevance of a module illustrated in FIG. 9. Note that, in the example of FIG. 10, the processing of S902 is performed with a viewpoint dependent module as a base point, but the processing of S902 may be performed with a module whose viewpoint relevance is determined equal to or greater than a predetermined threshold, as a base point.

Once the procedure is started in S1000 of FIG. 10, the data analysis unit 202 firstly selects one viewpoint dependent module (A) not yet subjected to the processing of S901 (S1001). In the example of FIG. 10, this module is a module, whose viewpoint relevance has been determined as "1", described in the per-module viewpoint relevance determination data table 215.

Next, the data analysis unit 202 extracts a module having an action relationship with the module (A), regardless of whether or not these modules have a call relationship with each other (S1002). The module viewpoint relevance of the module extracted in S1002 is calculated and then the value thereof is described into the per-module viewpoint relevance determination data table 215. Note that, as the determination item in this case, an item used in the situation of "not limited to call relationship" described in the action determination table 216 is used. In the example of FIG. 10, among the above items, the item "whether substituted into a global variable being used by a viewpoint-related module" is used in determination. As the viewpoint relevance of a module extracted by the procedure, a value obtained by multiplying the viewpoint relevance of a module having an action relationship by the viewpoint relevance weight described in the action determination table 216 is to be used, and this calculated value is described into the per-module viewpoint relevance determination data table 215. In the example of FIG. 10, a numeric value 0.8 obtained by multiplying the viewpoint relevance 1 of a microcomputer dependent module by the viewpoint relevance weight 0.8 serves as the viewpoint relevance. Here, a case is assumed where the category "microcomputer" is designated by a user. However, the determination item is not limited to the one used in this example, but other items, such as the item "whether written to the file being used by a viewpoint-related module", may be used, or a plurality of determination items may be additionally used.

Next, the data analysis unit 202 determines whether or not there is any module not yet subjected to the processing of S901 among the viewpoint dependent modules extracted in S901 of FIG. 9 (S1003). If it is determined that there is a module not yet subjected to the processing of S901 (S1003, No), the data analysis unit 202 returns to S1001, and acquires an unprocessed viewpoint dependent module. If it is determined that all the viewpoint dependent modules have been subjected to the processing of S901 (S1003, Yes), the data analysis unit 202 exits this processing flow and proceeds to S902 of FIG. 9. With the above processing flow, a module having an action relationship with a viewpoint dependent module can be extracted without being limited to a call relationship.

Figure 11:
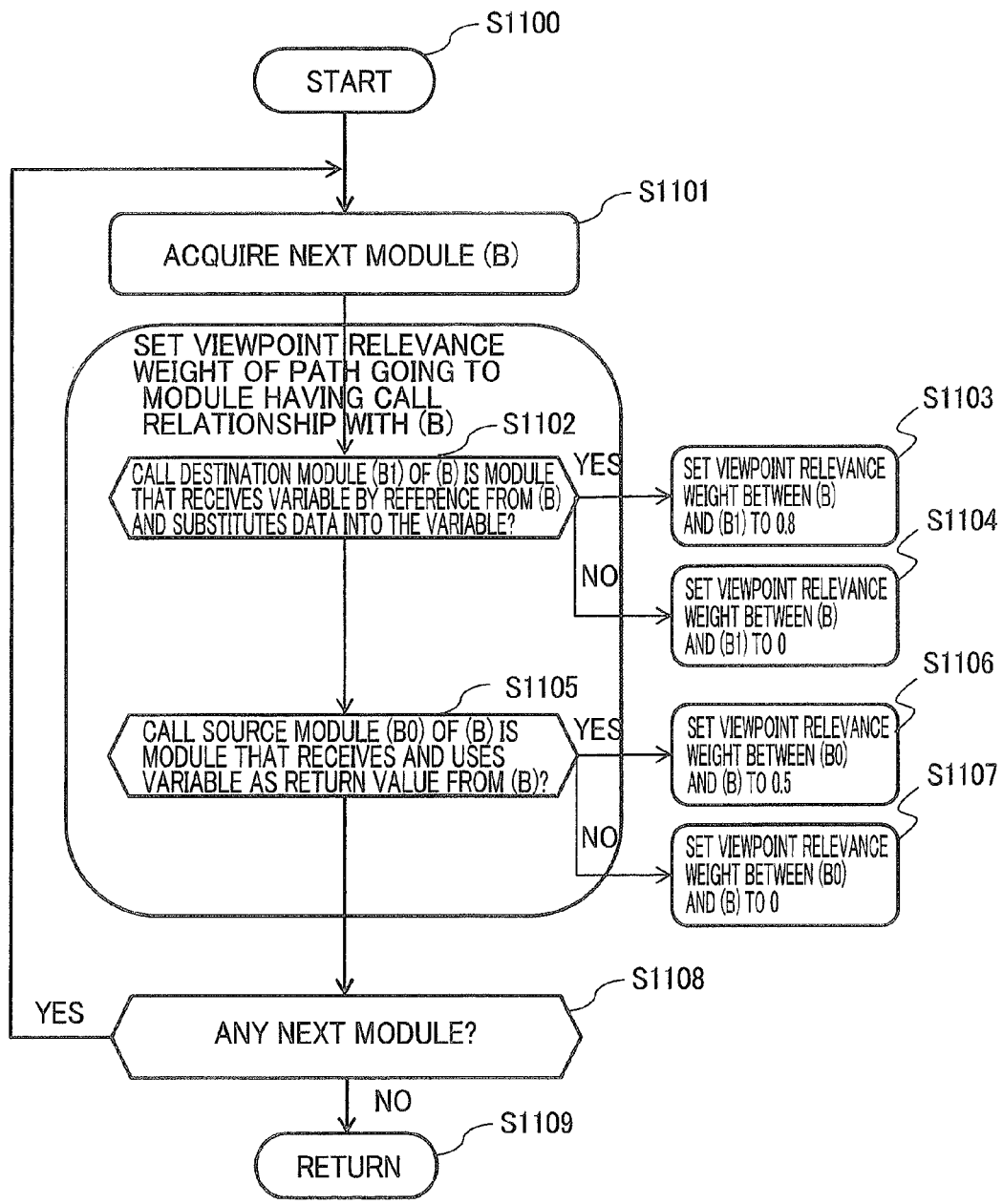
FIG. 11 illustrates an example of a flowchart of setting an inter-module path viewpoint relevance weight in the embodiment.

Next, the procedure for setting the inter-module path viewpoint relevance weight in the processing flow of calculating the viewpoint relevance of a module illustrated in FIG. 9 is described. FIG. 11 illustrates an example of the flowchart in setting the viewpoint relevance weights of the call paths present between all the modules related to the module call relationship diagram created in S804 of FIG. 8 using a call relationship between modules and a direct or indirect action relationship via common data. The flow details S903 of FIG. 9. As the determination items in the processing flow, the items used in the situation of "limited to call relationship" described in the action determination table 216 of FIG. 6 are used. Using these items, a viewpoint relevance weight that is the indicator indicative of the degree of the action relationship via the data between modules using a call relationship can be set to a path between modules, and can be used in the subsequently performed calculation of the viewpoint relevance for each module.

Once the procedure is started in S1100, the data analysis unit 202 selects one module (B) not yet subjected to the processing of S903 among all the modules related to the module call relationship diagram created in S804 of FIG. 8 (S1101). Next, the data analysis unit 202 sets an inter-module path viewpoint relevance weight between the selected module (B) and a call destination module (B1) thereof. Note that, in this case, in the example of FIG. 11, as the item used in setting a weight, the item used in the situation of "limited to call relationship" described in the action determination table 216 of FIG. 6 is used. In this example, the item "whether a variable is received by reference and substituted into the variable?" is assumed to be used. That is, the data analysis unit 202 determines whether the call destination module (B1) of the module (B) is the module that receives a variable from the module (B) by reference and substitutes the same into the variable. If it is determined that the call destination module (B1) of the module (B) is the module that receives a variable from the module (B) by reference and substitutes the same into the variable (S1102, Yes), then as the viewpoint relevance weight of the path between the module (B) and the module (B1), a viewpoint relevance weight described in the action determination table 216 of FIG. 6 is used. Here, since the viewpoint is "microcomputer", 0.8 as the viewpoint relevance weight from FIG. 6 is described into the inter-module path viewpoint relevance weight data table 217 (S1103). If it is determined that the call destination module (B1) of the module (B) is not the module that receives a variable from the module (B) by reference and substitutes the same into the variable (S1102, No), then as the viewpoint relevance weight of a path between modules, zero is used, and is described into the inter-module path viewpoint relevance weight data table 217 (S1104). Upon completion of the determination of all the call destination modules, the data analysis unit 202 proceeds to S1105. Note that, the viewpoint relevance weight when it is determined that the call destination module (B1) of the module (B) is not the module that receives a variable from the module (B) by reference and substitutes the same into the variable is set to zero in this example, but another value may be used.

Next, the data analysis unit 202 sets the inter-module path viewpoint relevance weight between the module (B) acquired in S1101 and the call source module (B0) thereof. Note that, in this case, as the item used in setting a weight, the items used in the situation of "limited to call relationship" described in the action determination table 216 of FIG. 6 are used. In this example, the item "whether a return value is received as a variable and used" in FIG. 6 is assumed to be used. If it is determined that "a return value is received as a variable and used" (S1105, Yes), then as the viewpoint relevance weight of the path between the modules, the data analysis unit 202 uses a viewpoint relevance weight described in the action determination table 216 of FIG. 6. That is, in the example of FIG. 6, since the viewpoint is "microcomputer", 0.5 as the viewpoint relevance weight is described in the inter-module path viewpoint relevance weight data table 217 (S1106). If it is determined that a return value is received as a variable but is not used (S1105, NO), the data analysis unit 202 uses zero as the viewpoint relevance weight of a path between the modules in this example, and is described into the inter-module path viewpoint relevance weight data table 217 (S1107).

Upon completion of the determination of all the call destination modules, the data analysis unit 202 proceeds to S1108. Note that, the viewpoint relevance weight when the determination result is "false" in the determination processing of S1102 and S1105 is set to zero in the example of FIG. 11, but another value may be used. Moreover, in S1103, S1104, S1106, and S1107, in describing a viewpoint relevance weight into the inter-module path viewpoint relevance weight data table 217, a value might have been already described. In that case, procedures, such as whichever is higher between an already described value and a value of this time is used, or an average between the both values is set, may be contemplated. In this example, in such a case, a higher value is used. Moreover, in this example, as in S1102 and S1105, a viewpoint relevance of a path going to a call destination module and a viewpoint relevance of a path going to a call source module are set, respectively, but the both do not necessarily need to be set.

Next, the data analysis unit 202 determines whether or not there is any module not yet subjected to the processing of S903 among all the modules related to the module call relationship diagram created in S804 of FIG. 8 (S1108). If it is determined that there is any module not yet subjected to the processing of S903 (S1108, Yes), the data analysis unit 202 returns to S1101, and acquires the next module (B). If it is determined that all the modules have been subjected to the processing of S903 (S1108, No), the data analysis unit 202 exits the processing flow and proceeds to S904 of FIG. 9.

Figure 12:
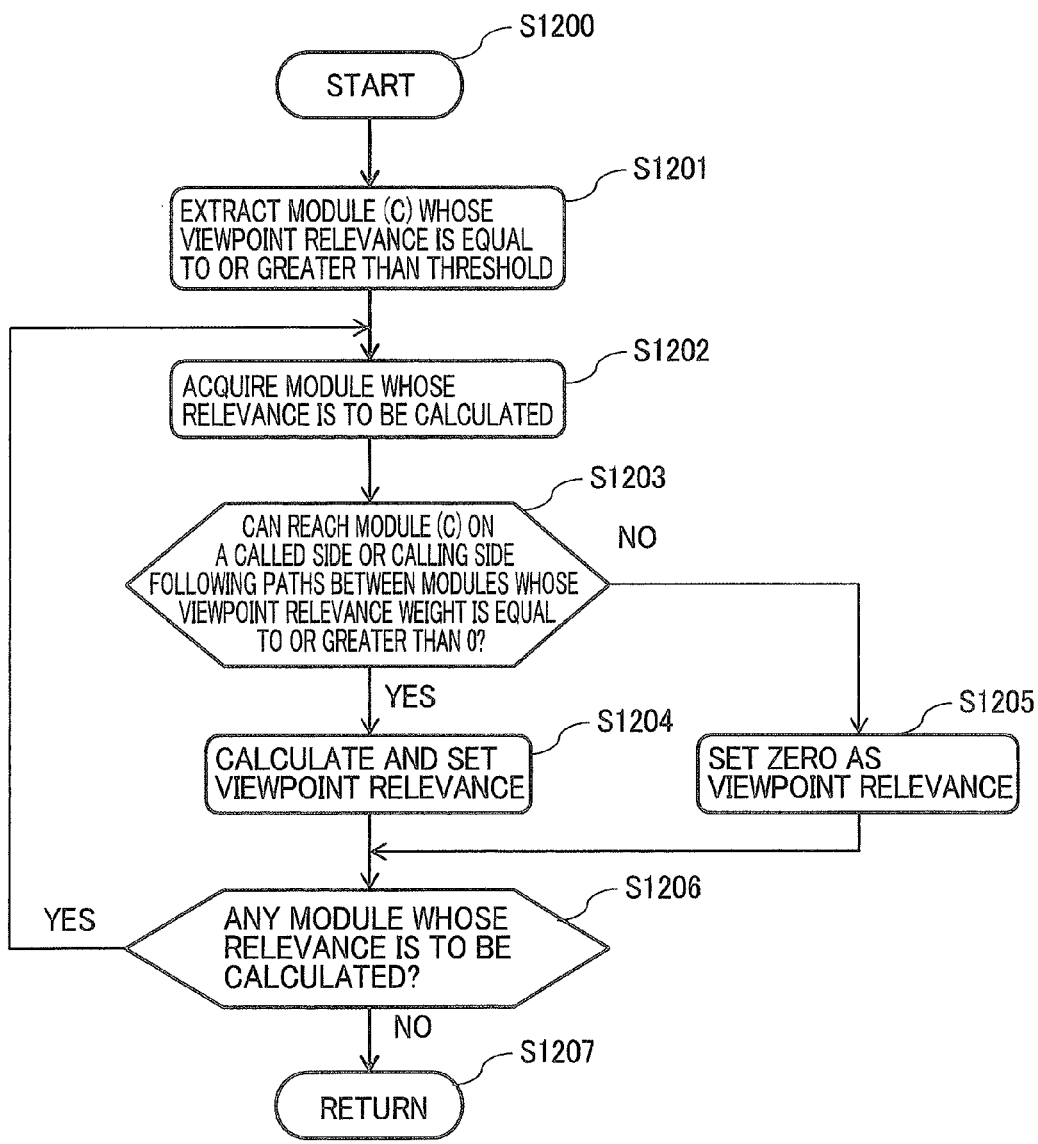
FIG. 12 illustrates an example of a flowchart of calculating a viewpoint relevance of a module using a call relationship between modules in the embodiment.

Next, the procedure for calculating the viewpoint relevance of a module using a call relationship is described. FIG. 12 illustrates an example of the processing flow of the module viewpoint relevance calculation processing that is performed, in S904 of FIG. 9, on all the modules related to the module call relationship diagram created in S804 of FIG. 8.

Once the procedure is started in S1200, the data analysis unit 202 firstly acquires all modules (C) whose values of the viewpoint relevance are equal to or greater than a predetermined threshold among the modules described in the per-module viewpoint relevance determination data table 215 (S1201). In this example, assume that all the modules whose numeric values of the viewpoint relevance are equal to or greater than one, i.e., all the viewpoint dependent modules, are acquired.

Next, the data analysis unit 202 acquires one of the modules whose viewpoint relevance is not described in the per-module viewpoint relevance determination data table 215, as a target module whose viewpoint relevance is to be calculated (S1202).

Next, the data analysis unit 202 determines whether or not the target module acquired in S1202 can reach a module (C) in a called side or calling side direction following paths between modules whose numeric values of the viewpoint relevance weight described in the inter-module path viewpoint relevance weight data table 217 is greater than zero (S1203). Hereinafter, all the modules that can reach the module (C) are collectively referred to as a "reachable module." If it is determined that the module (C) can be reached in a called side or calling side direction (S1203, Yes), the data analysis unit 202 proceeds to S1204. In S1204, the data analysis unit 202 calculates the viewpoint relevance of the target module, and describes the same into the per-module viewpoint relevance determination data table 215. A plurality of methods for calculating the viewpoint relevance in this case can be contemplated. In this example, calculation to multiply the viewpoint relevance of the module that can reach the module (C) by the viewpoint relevance weights of all the call paths that are followed before reaching the module (C) is performed on all the reachable modules, and a sum of these calculation results is set to the viewpoint relevance of the target module.

Figure 14:
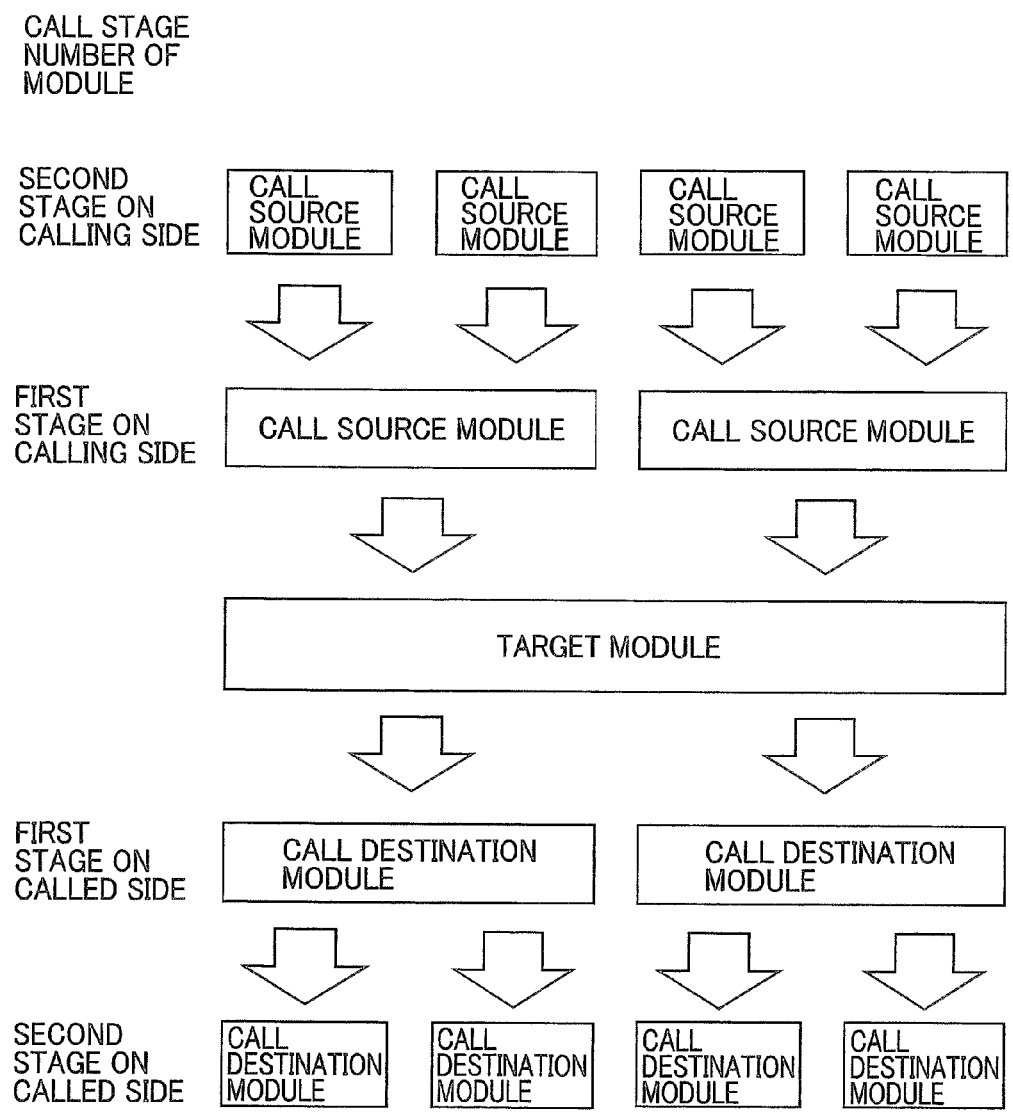
FIG. 14 is an explanatory diagram illustrating an example of a module call structure.

If it is determined that the module (C) cannot be reached in the called side or calling side direction (S1203, No), the data analysis unit 202 sets the viewpoint relevance of the target module to zero, and describes the same into the per-module viewpoint relevance determination data table 215. Note that, the call stage number of the module (C) relative to the module whose relevance is to be calculated does not necessarily need to be the first stage on the called side or the first stage on the calling side, but may be the second or subsequent stage on the called side or calling side. FIG. 14 illustrates the detail of the call stage number. As illustrated in FIG. 14, a module that directly calls a target module is defined as the module at the first stage on the calling side, while a module that directly calls the module at the first stage on the calling side is defined as the module at the second stage on the calling side. Similarly, a module that is directly called from a target module is defined as the module at the first stage on the called side, while a module that is directly called from the module at the first stage on the called side is defined as the module at the second stage on the called side.

Next, the data analysis unit 202 determines whether or not there is any module whose viewpoint relevance is not yet described in the per-module viewpoint relevance determination data table 215 (S1206). If it is determined that there is a module whose viewpoint relevance is not yet described in the per-module viewpoint relevance determination data table 215 (S1206, Yes), the data analysis unit 202 acquires the next module whose relevance is to be calculated in S1202. If it is determined that there is no module whose viewpoint relevance is not yet described in the per-module viewpoint relevance determination data table 215 (S1206, No), the data analysis unit 202 exits the processing flow of FIG. 12 and proceeds to S905 of FIG. 9.

Figure 13:
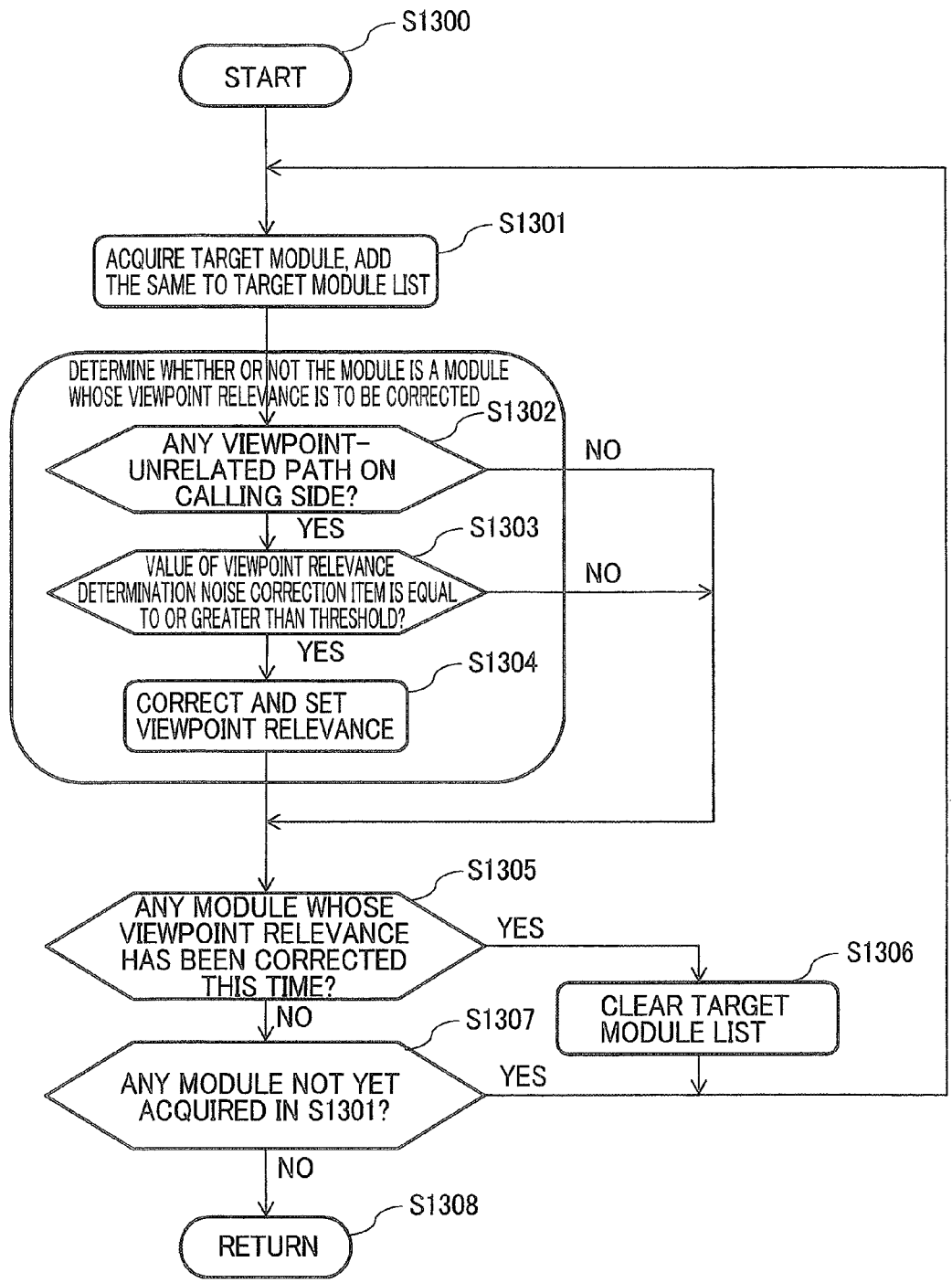
FIG. 13 illustrates an example of a flowchart of correcting the viewpoint relevance of a module in the embodiment.

Next, the procedure for correcting the viewpoint relevance of a module is described. FIG. 13 illustrates an example of the processing flow of the procedure for correcting the viewpoint relevances of all the modules described in the per-module viewpoint relevance determination data table 215. The processing flow details S905 of FIG. 9.

Once the processing is started in S1300, the data analysis unit 202 selects one module that is not yet recorded on a list that is created for the purpose of recognizing the module selected in S1301, among all the modules related to the module call relationship diagram created in S804 of FIG. 8. Subsequently, the module selected in this processing is added to the list (S1301).

Next, the data analysis unit 202 determines whether or not to correct the viewpoint relevance of the target module selected in S1301, the viewpoint relevance being described in the per-module viewpoint relevance determination data table 215. Specifically, as illustrated in FIG. 13, a series of these correction processes are performed in a flow from S1302 to S1304. As the determination items to determine whether or not to perform the correction used in this example, the items described in the viewpoint relevance determination noise correction threshold data table 214 are used. In this example, the item "the number of viewpoint-unrelated paths present on the calling side" is used for determination, but the determination items other than this may be used. Note that, according to the viewpoint relevance determination noise correction threshold data table 214, the following conditions are specified for the determination item: a module whose viewpoint relevance is greater than zero cannot be reached on the called side while a module whose viewpoint relevance is greater than zero can be reached on the calling side, by following the paths between the modules whose viewpoint relevance is greater than zero from the target module selected in S1301. This is because in this example, "viewpoint-unrelated" is defined as that the viewpoint relevance is zero. When "viewpoint-unrelated" is defined as that the viewpoint relevance of a module is equal to or less than a certain threshold, the above-described conditions turn into the following condition: a module whose viewpoint relevance is greater than a certain threshold cannot be reached on the called side while a module whose viewpoint relevance is greater than a certain threshold can be reached on the calling side. The data analysis unit 202 determines whether or not the above-described condition is satisfied and whether or not there is any viewpoint-unrelated path on the calling side (S1302). If it is determined that the above-described condition is satisfied and that there is a viewpoint-unrelated path on the calling side (S1302, Yes), the data analysis unit 202 proceeds to S1302. If it is determined that the above-described condition is not satisfied and that there is no viewpoint-unrelated path on the calling side (S1302, No), the data analysis unit 202 will not correct the viewpoint relevance and proceeds to S1305.

Next, with regard to a module determined as "true" in S1302, the data analysis unit 202 determines whether or not the value of the viewpoint relevance determination noise correction item specified by a user in S803 of FIG. 8 is equal to or greater than a threshold described in the viewpoint relevance determination noise correction threshold data 214 (S1303). If it is determined that the value of the viewpoint relevance determination noise correction item is equal to or greater than the threshold described in the viewpoint relevance determination noise correction threshold data 214 (S1303, Yes), the data analysis unit 202 sets a module to be processed as the module whose viewpoint relevance is to be corrected and proceeds to S1304. If it is determined that the value of the viewpoint relevance determination noise correction item is less than the threshold described in the viewpoint relevance determination noise correction threshold data 214 (S1303, No), the data analysis unit 202 will not correct the viewpoint relevance and proceeds to S1305. Note that, in this example, assume that a user designates "microcomputer" as the category and designates the "number of viewpoint-unrelated paths on the calling side" as the viewpoint relevance determination noise correction item in S803 of FIG. 8.

Therefore, the threshold used from the viewpoint relevance determination noise correction threshold data table 214 is one. That is, if there is at least one viewpoint-unrelated path on the calling side of a target module, this path serves as the object whose viewpoint relevance is to be corrected.

Next, with regard to the target module selected in S1302 and S1303, the data analysis unit 202 corrects the viewpoint relevance described in the per-module viewpoint relevance determination data table 215. The viewpoint relevance correction value of an item described in the viewpoint relevance determination noise correction threshold data table 214, which was used in determining whether or not to perform correction, is used for the correction. In this example, assume that a user designates "microcomputer" as the category and designates the "number of viewpoint-unrelated paths on the calling side" as the viewpoint relevance determination noise correction item in S803 of FIG. 8. Therefore, the correction value is zero. The data analysis unit 202 sets a value, which is obtained by multiplying the viewpoint relevance of a target module described in the per-module viewpoint relevance determination data table 215 by a correction value 0, to the viewpoint relevance of the target module, and describes the same into the per-module viewpoint relevance determination data table 215 (S1304).

Next, the data analysis unit 202 determines whether or not there is any module that has been corrected in the processing this time (S1305). If it is determined that there is a module that has been corrected in the processing this time (S1305, Yes), the data analysis unit 1305 clears a list of target modules, and proceeds to S1301 (S1306). If it is determined that there is no module that has been corrected in the processing this time (S1305, No), the data analysis unit 1305 proceeds to S1307.

In S1307, the data analysis unit 202 determines whether or not there is any module that is not yet recorded on the list that is created for the purpose of recognizing the module selected in S1301, among all the modules related to the module call relationship diagram created in S804 of FIG. 8. If it is determined that there is a module that is not yet recorded on the list (S1307, Yes), the data analysis unit 202 proceeds to S1301. If it is determined that there is no module that is not yet recorded on the list (S1307, No), the data analysis unit 202 exits the processing flow and proceeds to S806 of FIG. 8 from S906 of FIG. 9.

As described above, with the information processing device 100 of the embodiment, it is possible to solve the problem that although a module from the viewpoint of refactoring can be automatically selected, a module from the other viewpoints cannot be selected and therefore a target module needs to be manually selected and thus a considerable man-hour is taken for module selection. Furthermore, using the call relationship between modules and the use relationship of common data, a module related to a specific viewpoint included in a source code is automatically selected and a program diagram is constructed and displayed, so that the man-hour for visualization can be reduced.

Figure 15:
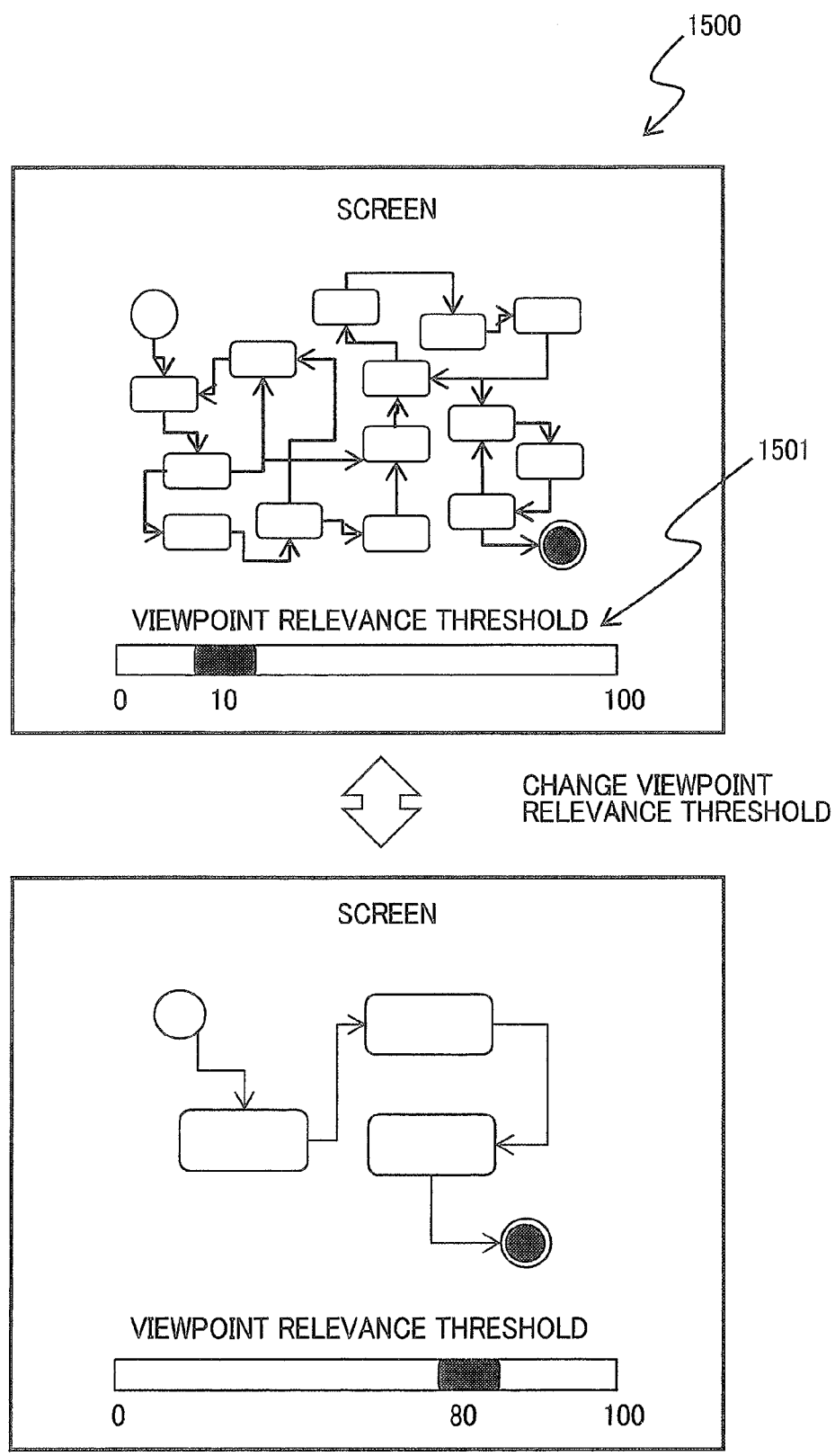
FIG. 15 illustrates an example of how a visualized program diagram varies with a change in the viewpoint relevance.

FIG. 15 illustrates an example of the program visualized by the information processing device 100 of the embodiment. A program diagram 1500 illustrated in FIG. 15 illustrates modules constituting a target program and data path between modules. In the program diagram created using the visualization method of the present invention, by changing the threshold of a viewpoint relevance or a viewpoint relevance determination noise correction threshold, the modules to be displayed can be changed. To what extent the viewpoint relevances and/or noise modules are included in the diagram varies with the purpose and/or intention of using the program diagram. Accordingly, for example, as illustrated in FIG. 15, a viewpoint relevance threshold slider 1501 is adjusted and the value thereof is used as a threshold instead of the threshold of a viewpoint relevance described in the viewpoint table 213, so that the program diagram can be re-configured as needed according to the purpose and/or intention of using the program diagram. Note that, in the embodiment, the viewpoint relevance of a module is used by determining whether or not to display the module, but not limited thereto, and various usages, such as the usage by determining whether or not to highlight the module, can be contemplated.

Note that, the present invention is not limited to the above-described embodiment but includes various variants. For example, the above embodiment has been described in detail in order to clearly explain the present invention, and the present invention is not necessarily limited to the embodiment including all the described configurations. Moreover, a part of the configuration of the embodiment can be replaced with another configuration, and also another configuration may be added to the configuration of the embodiment.

What is claimed is:

1. A program visualization device for visualizing a program in units of modules included in a source code of the program, comprising:
    processor and associated memory components configured as:
        a source code acquisition unit for acquiring the source code to be visualized;
        a word data acquisition unit for acquiring word data described in the source code itself or in another source code or data related to the source code;
        a viewpoint information storage unit configured to associate and store viewpoint information that is to be noted in visualizing the modules and a viewpoint relevance threshold set for each piece of viewpoint information;
        a keyword storage unit configured to store, as a keyword, the word data that the word data acquisition unit has acquired from the source code based on the viewpoint information stored in the viewpoint information storage unit;
        a per-module viewpoint relevance determination data storage unit configured to store a viewpoint relevance set for each of the modules;
        an action determination table that associates and stores an item used for calculating a viewpoint relevance of each of the modules and viewpoint relevance weight data that is a weighting factor related to the viewpoint relevance;
        a viewpoint relevance weight data storage unit of an inter-module path configured to associate and store an inter-module call path used for calculating the viewpoint relevance of each of the modules and a viewpoint relevance weight data set for each inter-module call path;
        a module call relationship extraction unit for extracting a module call relationship indicative of a call relationship between modules included in the source code;
        a data analysis unit for calculating, for each of the extracted modules, a viewpoint relevance and storing the calculation result into the per-module viewpoint relevance determination data storage unit in consideration of a viewpoint relevance weight related to the call relationship between modules with a viewpoint dependent module as a base point, which is a module extracted using a keyword corresponding to the viewpoint information stored in the viewpoint information storage unit or a viewpoint relevance weight related to a common data usage relationship recorded in the action determination table;
        a module extraction unit for extracting a module from inside the source code;
        a visualization determination unit configured to determine whether or not to visualize the module extracted from the source code, by comparing the viewpoint relevance of each of the modules stored in the per-module viewpoint relevance determination data storage unit and a viewpoint relevance set in a corresponding keyword stored in the viewpoint information storage unit;
        a viewpoint relevance determination correction information storage unit configured to associate the viewpoint relevance set for each of the modules with a determination item, a determination condition, the viewpoint information, a determination threshold, and a viewpoint relevance correction value for correcting a criterion to determine whether or not to visualize the module, and store as viewpoint relevance determination correction information; and
        a viewpoint relevance correction unit configured to compare a value of the calculated viewpoint relevance with a threshold acquired from the viewpoint relevance determination correction information storage unit or a threshold specified by a user to acquire a corresponding viewpoint relevance correction value, with respect to a module whose viewpoint relevance has been calculated, correct the viewpoint relevance using the viewpoint relevance correction value, and store a correction result into the per-module viewpoint relevance determination information storage unit; and
    a display unit configured to display the module, which the visualization determination unit has determined to visualize, in a predetermined format.

2. The program visualization device according to claim 1, wherein the viewpoint relevance correction unit compares a value of the viewpoint relevance determination correction item with a threshold acquired from the viewpoint relevance determination correction information storage unit or a threshold specified by a user, with respect to a module having the viewpoint-related module at a call destination or a call source, and the viewpoint relevance correction unit corrects the viewpoint relevance when the value of the viewpoint relevance determination correction item is greater than the threshold acquired from the viewpoint relevance determination correction information storage unit or the threshold specified by the user, and does not correct the viewpoint relevance when the value of the viewpoint relevance determination correction item is smaller than either of the thresholds.

3. The program visualization device according to claim 2, wherein the viewpoint relevance correction unit uses a number of viewpoint-unrelated paths going to a call source module based on each of the viewpoint dependent modules, a ratio of the viewpoint-unrelated path relative to all paths going to the call source module, or a number of calling stages from the viewpoint dependent module as a viewpoint relevance determination correction item, and corrects the viewpoint relevance when the value of the viewpoint relevance determination correction item is greater than the threshold acquired from the viewpoint relevance determination correction information storage unit or the threshold specified by the user, while the viewpoint relevance correction unit does not correct the viewpoint relevance when the value of the viewpoint relevance determination correction item is smaller than either of the thresholds.

4. The program visualization device according to claim 1, wherein the data analysis unit, with respect to the module having one viewpoint-related module at a call destination or a call source of the viewpoint dependent module, calculates the viewpoint relevance by multiplying the viewpoint relevance weighting factor set to all call paths present before reaching the viewpoint-related module by the viewpoint relevance calculated for the viewpoint-related module.

5. The program visualization device according to claim 4, wherein the data analysis unit, with respect to a module having a plurality of viewpoint-related modules at a call destination or a call source, calculates a viewpoint relevance by summing all viewpoint relevances that are calculated based on the respective viewpoint-related modules.

6. The program visualization device according to claim 1, wherein the data analysis unit determines whether or not a plurality of the modules uses common data, and calculates a viewpoint relevance of each of the modules using a viewpoint relevance weighting factor corresponding to this determination result.

7. The program visualization device according to claim 6, wherein the data analysis unit, in determining whether or not a plurality of the modules uses common data, uses a common data usage determination item unrelated to a call relationship of each of the modules or the common data usage determination item related to a call relationship of each of the modules, to set a viewpoint relevance weight to the call path between modules when the common data usage determination item related to a call relationship of each of the modules is used.

8. The program visualization device according to claim 5, wherein the data analysis unit uses criteria: "whether a plurality of the modules substitutes the data into a common global variable"; "whether it writes the data into a common file or DB"; "whether it receives a variable by reference and substitutes the data into the variable"; and "whether it receives and uses a return value as a variable", as a determination item to determine whether or not the plurality of the modules uses common data, to calculate a viewpoint relevance of each of the modules using a viewpoint relevance weight corresponding to each item when any of the criteria is met.

9. The program visualization device according to claim 1, wherein the data analysis unit, in determining whether or not a plurality of the modules uses common data, uses a common data usage determination item unrelated to the call relationship between modules, and then uses the common data usage determination item related to the call relationship between modules.

10. A program visualization method for visualizing a program in units of modules included in a source code of the program, comprising the steps of: by a computer including a processor and a memory, acquiring the source code to be visualized;

acquiring word data described in the source code itself or another source code or data related to the source code;

associating and storing viewpoint information that is to be noted in visualizing the modules and a viewpoint relevance threshold set for each piece of viewpoint information;

storing, as a keyword, the word data that the word data acquiring step has acquired from the source code based on the stored viewpoint information;

storing a viewpoint relevance set for each of the modules;

associating and storing an item used for calculating a viewpoint relevance of each of the modules and a viewpoint relevance weight that is a weighting factor related to the viewpoint relevance;

associating and storing a call path between modules used for calculating the viewpoint relevance of each of the modules and the viewpoint relevance weight data set for each inter-module call path;

extracting a module call relationship indicative of a call relationship between modules included in the source code;

calculating, for each of the extracted modules, the viewpoint relevance and storing the calculation result in consideration of viewpoint relevance weight data related to the call relationship between modules with a viewpoint dependent module as a base point, which is a module extracted using a keyword corresponding to the stored viewpoint information or viewpoint relevance weight data related to a common data usage relationship recorded in an action determination table;

extracting a module from inside the source code;

determining whether or not to visualize the module extracted from the source code by comparing the stored viewpoint relevance of each of the modules and the stored viewpoint relevance set to a corresponding keyword;

outputting the module, which is determined to be visualized, in a predetermined format;

associating the viewpoint relevance set for each of the modules with a determination item, a determination condition, the viewpoint information, a determination threshold, and a viewpoint relevance correction value for correcting a criterion to determine whether or not to visualize the module, and store as viewpoint relevance determination correction information; and comparing a value of the calculated viewpoint relevance with a threshold acquired from the viewpoint relevance determination correction information storage unit or a threshold specified by a user to acquire a corresponding viewpoint relevance correction value, with respect to a module whose viewpoint relevance has been calculated, correct the viewpoint relevance using the viewpoint relevance correction value, and store a correction result into the per-module viewpoint relevance determination information storage unit.

\* \* \* \* \*